United States Patent [19]

Parisi

[11] Patent Number: 4,807,156

[45] Date of Patent: Feb. 21, 1989

[54] ADJUSTABLE PRINT SIZE CONTROL FOR RASTER OUTPUT SCANNERS

[75] Inventor: Michael A. Parisi, Fairport, N.Y.

[73] Assignee: Xerox Corporation, Stamford, Conn.

[21] Appl. No.: 29,012

[22] Filed: Mar. 23, 1987

[51] Int. Cl.⁴ .................................................. G06F 5/06
[52] U.S. Cl. ..................................... 364/519; 358/287; 355/57
[58] Field of Search ................... 364/519, 523; 355/85, 355/104, 110, 55, 57, 63; 358/285, 287, 288, 292, 293

[56] References Cited

U.S. PATENT DOCUMENTS

| | | | |
|---|---|---|---|
| 3,541,245 | 11/1970 | Wilby | 358/287 X |
| 4,153,896 | 5/1979 | White | 340/731 |
| 4,283,724 | 8/1981 | Edwards | 340/731 |
| 4,357,604 | 11/1982 | Imazeki et al. | 340/731 |
| 4,365,276 | 12/1982 | Kokaji et al. | 358/288 X |
| 4,366,508 | 12/1982 | Crean et al. | 358/287 |
| 4,367,533 | 1/1983 | Wiener | 364/519 |
| 4,613,877 | 9/1986 | Spencer et al. | 358/293 X |
| 4,650,317 | 3/1987 | Oushiden et al. | 355/57 |
| 4,687,944 | 8/1987 | Mitsuka et al. | 358/293 X |

Primary Examiner—Gary V. Harkcom
Assistant Examiner—Mark K. Zimmerman
Attorney, Agent, or Firm—Frederick E. McMullen

[57] ABSTRACT

Adjustable image print magnification system for a printer of the type using a raster output scanner having a rotating scanning polygon, a pixel clock providing clock signals for clocking pixels from an image signal source to the scanner, a polygon clock for controlling the rotating speed of the polygon, a first cycle stealing circuit for reducing the scanner pixel and polygon clocks together to control image length, and a second cycle stealing circuit for reducing the pixel clock only to control image width.

4 Claims, 4 Drawing Sheets

ADJUSTABLE PRINT SIZE CONTROL FOR RASTER OUTPUT SCANNERS

The invention relates to laser printers, and more particularly, to an improved control for adjusting the size of the image printed by the printer.

A substantial number of the printers on the market today are what are generally referred to as laser printers. In printers of this type, a high intensity beam derived from a laser and modulated or controlled in response to an image signal or pixel input serves to expose a recording member which is typically a photoreceptor associated with a xerographic type imaging system. In this case, exposure is carried out by repeatedly scanning the laser beam across the photoreceptor in what is generally referred to as the fast scan direction. At the same time, the photoreceptor is moved in a direction perpendicular to the direction of scan by the laser beam in what is referred to as the slow scan direction.

Following exposure and the formation of a latent electrostatic image on the photoreceptor, the image is developed by a suitable marking material such as toner. The developed image is then transferred to a suitable copy substrate material, usually a copy sheet, and the transferred image fixed or fused to provide a permanent print of the image represented by the image signals or pixels.

In printers of this type, cost is an important and significant factor to the acceptability of the printer in the market place. Thus various enhancements, which typically add to the cost and which are often desirable, are often not provided because of the cost penalty incurred in doing so. One desirable enhancement, however, in printers of this type, is the ability to change, at the option of the user, the size of the print produced. Size selection of this type basically involves the ability of the operator to adjust the size of the image during exposure in either the fast or slow scan direction, or both.

In the prior art, a process for changing image size is disclosed in U.S. Pat. No. 4,153,896 issued to White. There image data is read out from a memory in one direction and into a second memory at a first clock rate chosen to provide the image size desired in that direction, and then read out from the second memory in a direction perpendicular to the first direction to a third memory at a second clock rate chosen to provide the image size desired in that direction. In U.S. Pat. No. 4,367,533 issued to Wiener, a bit structuring apparatus uses a programmable divide-by-N counter to reduce the frequency of the pixel stream and expand the alpha numeric characters along the X-axis with a programmable counter to control interpolation of extra lines to expand the characters along the Y-axis. U.S. Pat. No. 4,357,604 to Imazeki et al has means for frequency dividing character dot and character clock pulses while controlling step-by-step advancement of the character row addressed to control character size. U.S. Pat. No. 4,283,724 to Edwards has a variable character size/position control in which scan line control signals are modulated to regulate character height and position with character width controlled through selection of the clock rate at which signals are read out. And, in the case of document scanners wherein an image bearing document on a platen is scanned by an array of photosensitive elements such as a CCD, U.S. Pat. No. 4,366,508 to Crean et al discloses image magnification/demagnification for scanners of that type in which pixel clock signal frequency governing the CCD output is varied to control size in the X-direction with document scanning speed controlled to vary size in the Y-direction.

In contrast to the prior art, the present invention provides a printer magnification control for selectively controlling the width and/or length of the images printed by a printer. The printer has a laser beam for exposing a photoconductive member; a clock controlled rotatable scanning element for scanning the beam across the photoconductive member; control means for controlling beam intensity in accordance with clocked image pixels; a master clock; a first operator for adjusting the master clock output signal to provide a pixel clock signal at a predetermined frequency used for clocking the image pixels to the beam control means; a second operator for adjusting the master clock output signal to provide a scanning element clock signal at a predetermined frequency for use in controlling the rotational speed of the scanning element; magnification adjustment control provided by a first adjustable cycle stealing circuit interposed between the master clock and the first and second operators for periodically dropping a selected one of the clock pulses from the master clock output signal thereby proportionally affecting both the speed of the scanning element and the frequency of the pixel clock resulting in a change to the length of the images printed by the printer; and a second adjustable cycle stealing circuit interposed between the first cycle stealing circuit and only the second operator for periodically dropping a selected one of the clock pulses in the clock signal output of the first cycle stealing circuit to the second operator thereby proportionally affecting only the frequency of the pixel clock signal output of the first operator resulting in a change to only the width of the images produced by the printer.

IN THE DRAWINGS

Figure 1:
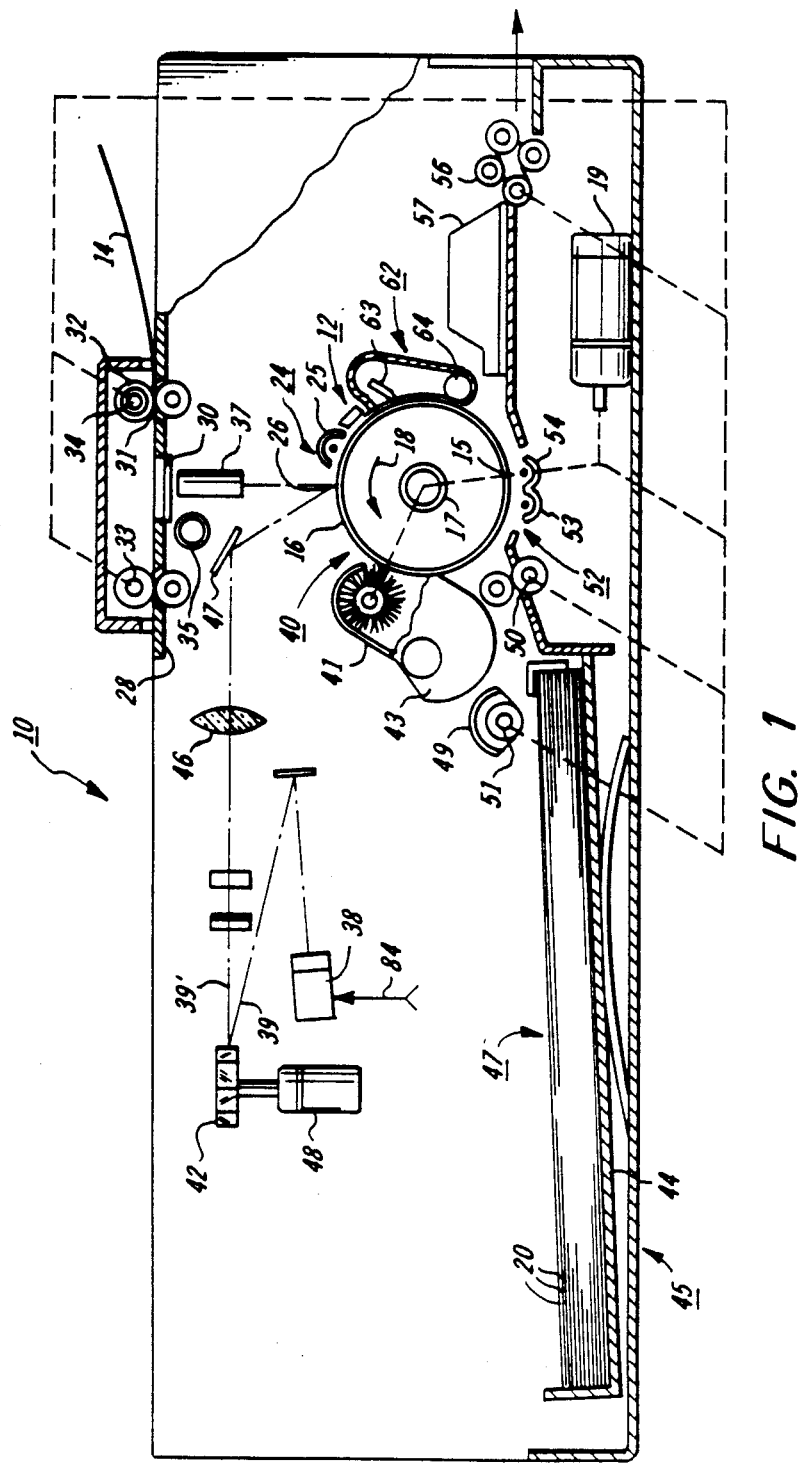
FIG. 1 is a side view depicting a printer of the type adapted to incorporate the adjustable print size control of the present invention.

Referring to FIG. 1 of the drawings, there is shown an exemplary printer, designated generally by the numeral 10 of the type adapted to incorporate the low cost adjustable print size control of the present invention. Printer 10 comprises a dual mode printer having a xerographic copying capability as well as a printing capability.

The printer 10 depicted in FIG. 1 illustrates the various components utilized in a machine of this type for producing either copies of a document original 14 or prints derived from an image signal or pixel input. Although the adjustable print size control of the present invention is particularly well adapted for use in printer 10, it should become evident from the following description that the invention is equally well suited for use in a wide variety of other printer types and systems such as single mode printers, other multiple mode printers, color printers, etc.

Printer 10 has an image recording photoreceptor 15 in the form of a drum, the outer periphery of which has a suitable photoconductive material 16. Photoreceptor 15 is suitably supported for rotation within the machine frame (not shown) by shaft 17. A main drive motor 19 is drivingly coupled to photoreceptor 15, motor 19 rotating photoreceptor 15 in the direction indicated by arrow 18 to bring the photoconductive surface 16 of photoreceptor 15 past a series of xerographic processing stations.

A suitable microprocessor based controller (not shown) is provided for operating the various components that comprise printer 10 in predetermined timed relationship with one another to make copies or prints upon a sheet of final support material such as sheet 20. As will be understood by those familiar with the art, suitable memory (not shown) is provided to store the various operating parameters of printer 10 and to store any user programming instructions.

Initially, the photoconductive surface 16 of photoreceptor 15 is uniformly charged by a suitable charging device such as scorotron 25 at charging station 24. When operating in the copying mode, the uniformly charged photoconductive surface 16 is exposed at exposure station 26 to create a latent electrostatic image of the documdnt original 14 on photoreceptor 15. For this purpose, a suitable supporting surface or platen 28 for document original 14 is provided having a scan aperture or slit 30 therethrough. A suitable document transport, depicted herein as inlet and outlet constant velocity roll pairs 32, 33, is provided for transporting the document original past scan slit 30. Roll pairs 32, 33 are drivingly coupled to main drive motor 19, roll pair 32 being coupled through an electromagnetically operated clutch 34. A suitable document sensor 31 is provided at the inlet to platen 28 for sensing the insertion of a document original 14 to be copied and initiating operation of the printer 10.

A lamp 35, which is disposed below platen 28, serves to illuminate scan slit 30 and the line-like portion of the document original 14 thereover. A suitable fiber optic type lens array 37 which may for example comprise an array of gradient index fiber elements, is provided to optically transmit the image rays reflected from the line-like portion of the document original being scanned to the photoconductive surface 16 of photoreceptor 15 at exposure station 26.

For operation in the printing mode, a raster output scanner with a suitable source of high intensity radiation such as laser diode 38 is provided. The high intensity beam 39 output by diode 38 is impinged on the mirrored surfaces of a rotating polygon 42, the reflected beam 39' being focused by suitable optical means exemplified here by lens 46 and mirror 47 onto photoreceptor 15 at exposure station 26. Polygon 42 is rotatably driven by motor 48. Imaging beam 39' is modulated or controlled in response to image signals or pixels input to the laser diode laser and modulator driver 84.

Polygon motor 48 is a four phase AC hysteresis synchronous motor. As will be understood, motors of this type rotate at a speed which is precisely determined by the frequency of the input voltage, high frequency input yielding high speed while low frequency input yields slow speed. Variations in voltage only affect the amount of power available from the motor.

The drive circuitry for motor 48 (motor control 86 in FIG. 2) consists of a circuit (not shown) to create the appropriate number of phases required by motor 48 and an amplifier (not shown) which increase the power in each phase to a level sufficient to run the motor. The amplifier's output is connected to the motor. The motor runs at a speed precisely related to the frequency of the motor clock, identified as polygon clock 73 in FIG. 2.

While a four phase hysteresis synchronous motor is shown, the invention is not so limited but is instead applicable to all synchronous and non-synchronous motors where motor speed is controlled by a clock frequency. As one example of this, a brushless DC motor which is phase locked to a click may be used by supplying an external clock.

Following exposure, the latent image created on the photoconductive surface 16 of photoreceptor 15 is developed at a development station 40. There, a suitable developer such as magnetic brush roll 41, which is mechanically coupled to main drive motor 19, brings a suitable developer mix in developer housing 43 into developing relation with the latent image to develop the image and render the same visible.

Sheets 20 are supported in stack-like fashion on base 44 of copy sheet supply tray 45. Suitable biasing means are provided to raise base 44 of tray 45 and bring the topmost sheet 40 in the stack of sheets into operative relationship with segmented feed rolls 49. Feed rolls 49 are driven by main drive motor 19 through an electromagnetically operated clutch 51. Rolls 49 serve upon actuation of clutch 51 to feed the topmost sheet forward into the nip of a registration roll pair 50 which register the sheet with the image on the photoconductive surface 16 of photoreceptor 15. Registration roll pair 50 advance the sheet to transfer station 52. There, suitable transfer/detack means such as transfer/detack corotrons 53, 54 bring the sheet into transfer relation with the developed image on photoconductive surface 16 and separate the sheet therefrom for fixing and discharge as a finished copy or print.

Following transfer station 52, the image bearing copy sheet is transported to a radiant type non-contact fuser 57 where the image is permanently fixed to the sheet. Following fusing, the finished copy or print is transported by roll pair 56 to a suitable receptacle such as an output tray (not shown). Registration roll pair 50 and transport roll pair 56 are driven by main drive motor 19 through suitable driving means such as belts and pulleys.

After transfer, residual toner remaining on the photoconductive surface 16 of photoreceptor 15 is removed at cleaning station 62 by means of cleaning blade 63. Toner removed by blade 63 is deposited into a suitable collector 64 for removal.

While a polygon type scanning element is shown, other forms of scanning elements such as holographic disk may be envisioned. And while a laser diode is shown and described, other suitable sources of high intensity radiation such as a gas type laser may be used. It is understood that where the radiation source comprises a gas laser, a separate modulator such as an acousto-optic modulator is required to modulate the laser beam in accordance with the image signal or pixels.

Figure 2:
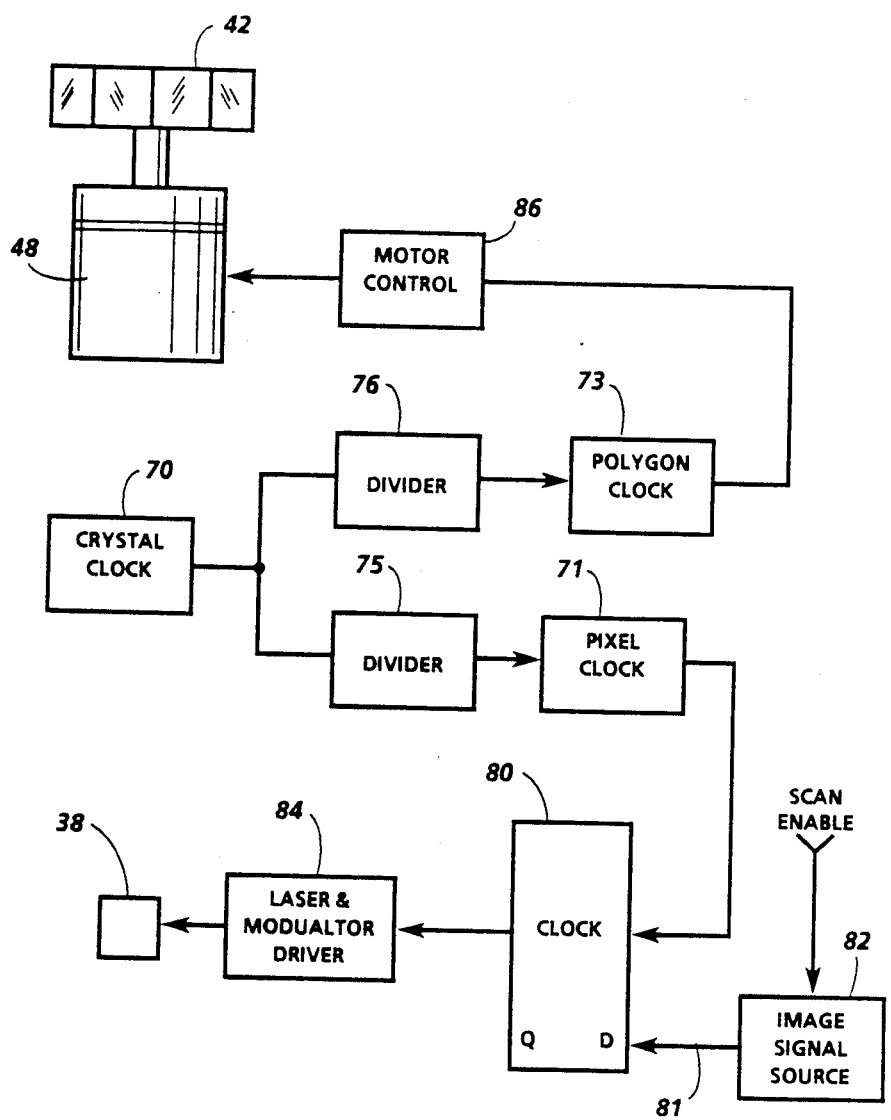
FIG. 2 is a schematic view illustrating the pixel and polygon clock sources for the printer shown in FIG. 1.

Referring now to FIG. 2 of the drawings, a suitable master clock such as a crystal 70 serves as the source of clock signals for operating the raster output scanner portion of printer 10. The pixel clock 71 provides clock signals for clocking the image signals or pixels from a suitable image signal source 82 to the laser and modulator driver 84 for laser diode 38. The motor clock, designated here as polygon clock 73, provided clock signals for controlling the rotational speed of polygon 42. To obtain the specific pixel clock and polygon clock frequencies desired, suitable clock frequency dividers, shown here as pixel and polygon clock dividers, 75, 76 respectively, are employed to change the frequency of the clock signal output of crystal 70 to pixel clock 71 and polygon clock 73.

Image signal source 82 may comprise any suitable source of image signals or pixels such as memory, communication line, etc. To synchronize the output of image signals from image signal source 82 with the sweep of beam 39' across the photoconductive surface 16 of photoreceptor 15, a suitable scan enable signal is fed to an input of image signal source 82. For this purpose, a scan detector (not shown) may be used to sense the instantaneous position of scanning beam 39', and this information employed to generate the scan enable signal at the proper time during each scan of beam 39' across photoreceptor 15.

The pixel clock signals from pixel clock 71 are input to the clock terminal of a D style flip flop 80. On input of each scan enable signal to image signal source 82, a stream of image signals or pizels representing one scan line are output by source 82 through D style flip flop 80 to laser and modulator driver 84 to modulate or control the intensity of beam 39' output by laser diode 38 in accordance with the image signal or pixel content.

The motor clock output of polygon clock 73 is input to controller 86 for polygon motor 48, controller 86 controlling the operating speed of motor 48 and hence the scanning speed of polygon 42 in accordance with the frequency of the polygon clock signal output of clock 73.

In the ensuing description, image length refers to the size of the image in the direction of movement of the photoreceptor (i.e., the slow scan direction) while image width refers to the size of the image in the direction of scanning of beam 39' (i.e., the fast scan direction). It will be understood that the size of the scanned image produced on the photoconductive surface 16 of photoreceptor 15 is dependent on the speed of photoreceptor 15, the rotational speed of polygon 42, and the frequency of the pixel clock 71. Photoreceptor speed affects the length of the image in the slow scan direction, while polygon speed affects the length and width of the image in both the slow and fast scan directions. The pixel clock signals affect the width of the image in the fast scan direction only. Thus, if the frequency of the clock signals output by crystal 70 is varied, only the length of the image in the slow scan direction will change. This is because both the frequency of the pixel clock 71 and the polygon clock 73 will change by the exact same percentage since crystal 70 is the common source of clock signals and thus the increase and decrease in image width that results will cancel each other out. For example, if the frequency of the clock signals output by crystal 70 is increased by 1%, both the frequency of the pixel clock signals output by pixel clock 71 and the frequency of the clock signals output by polygon clock 73 will increase by 1%. Since the clock signal output of polygon clock 73 controls the speed at which polygon drive motor 48 rotates polygon 42, this represents an increase in the rotational speed of polygon 42 of 1% which, in turn, reduces image length and increases image width. Increasing the frequency of the pixel clock signals output by pixel clcok 71 reduces image width. As a result, the like increase and decrease in image width due to the increase in pixel clock frequency and polygon speed cancel each other out, resulting in only a change in image length.

Figure 3:
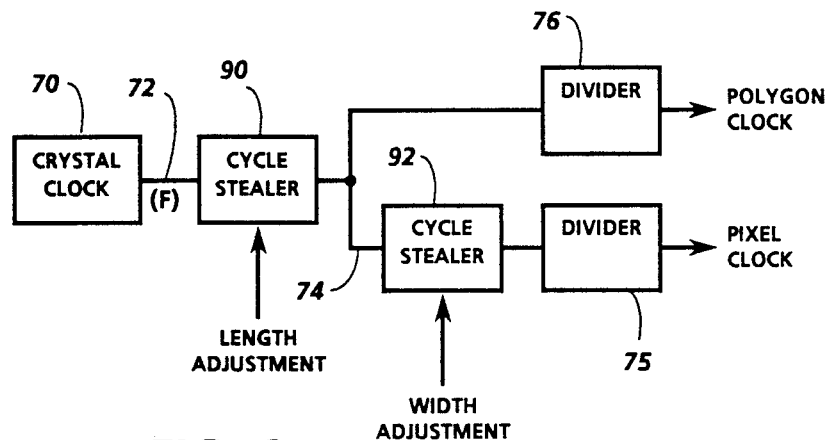
FIG. 3 is a schematic view illustrating the clock circuits shown in FIG. 2 in which plural cycle stealing circuits are used to enable print size to be controlled in accordance with the teachings of the present invention.

Referring now to FIG. 3, an adjustable cycle stealing circuit 90 is interposed in the clock output line 72 of crystal 70. A second adjustable cycle stealing circuit 92 is interposed in the clock input line 74 to pixel clock divider 75. Cycle stealing circuits 90, 92 periodically drop (i.e., steal) a clock cycle from the stream of clock signals input to circuits 90, 92, the frequency of the cycle dropping being adjustable as will appear. By adjusting cycle stealing circuit 90 to periodically drop at a selected rate a clock pulse from the stream of pixel clock pulses passing through circuit 90, the image length may be changed. Similarly, by adjusting cycle stealing circuit 92 to periodically drop at a selected rate a clock pulse from the stream of clock pulses passing through circuit 92, the image width can be changed.

Figure 4:
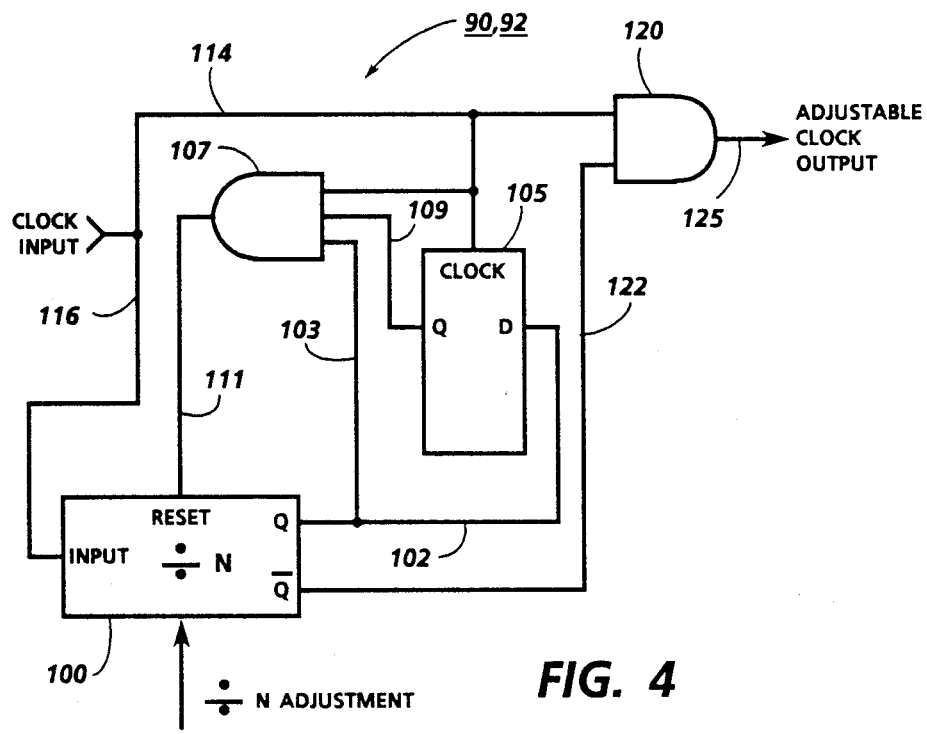
FIG. 4 is a schematic view illustrating details of the cycle stealing portion of the circuits shown in FIG. 3.

Referring now to FIG. 4, cycle stealing circuits 90, 92 each employ a programmable divide-by-N divider 100, the Q output of which is connected by lines 102, 103 to the D input of D type flip flop 105 and to one input of an AND gate 107 respectively. The Q output of flip flop 105 is coupled by line 109 to a second input of gate 107. Line 111 connects the output of gate 107 to the reset input of divider 100. The clock signal input to the cycle stealing circuits (i.e., from crystal 70 for circuit 90 or from circuit 90 for circuit 92) is split and applied through line 116 to the clock input of divider 100, and through line 114 to the clock input of flip flop 105, to a third input of gate 107, and to one input of an AND gate 120. The Q not output of divider 100 is coupled by line 122 to a second input of gate 120.

The divide-by-N divider 100 is triggered on the negative going edge for both clock and reset inputs. The D flip flop 105 is triggered on the positive going edge of the clock.

Figure 5:
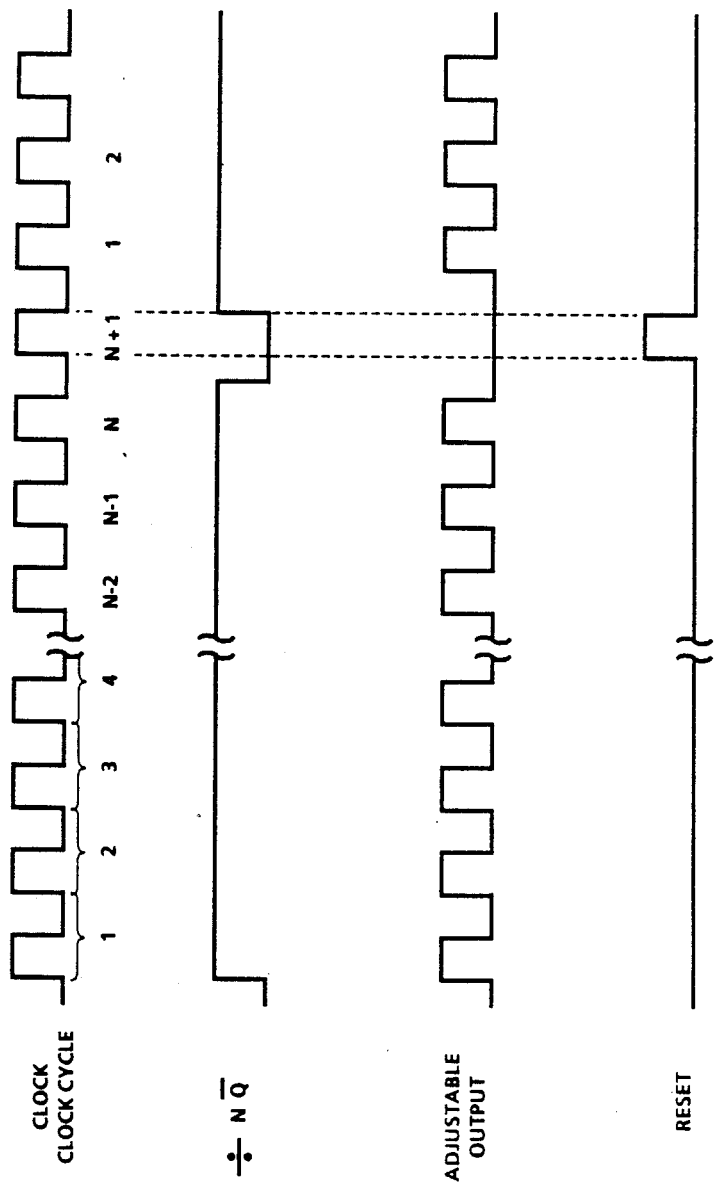
FIG. 5 is a timing diagram for the cycle stealing circuit shown in FIG. 4 where every N clock pulse is dropped from the clock output.

Referring now to FIGS. 3–5 and Table I, programmable divider 100 is presumed to be set (divide-by-N adjustment) to a predetermined count of N which will cause divider 100 to generate a state change in its output signal on every N clock pulses where N is an integer number taken from Table 1. At the start of a cycle, the Q not output 122 of divider 100 is high. Accordingly, AND gate 120 is enabled through line 122 allowing the clock signals in line 114 to pass through gate 120 to the output 125. At the same time, clock signals input to divider 100 through line 116 are tolled by divider 100. On the count reaching N, the Q not output 122 of divider 100 goes low, disabling output gate 120 and blocking the output of the next clock cycle to line 125 while the Q output 102 of divider 100 goes high, setting flip flop 105 on the next clock cycle. As a result, the Q outputs of divider 100 and flip flop 105 to gate 107 are high, readying gate 107 for actuation. On the next succeeding clock signal, gate 107 is triggered to output a reset pulse to divider 100 through line 11, resetting divider 100. Resetting of divider 100 causes the Q output of divider 100 to go high, enabling gate 120 and allowing the output of clock pulses to resume. With divider 100 reset, the aforedescribed cycle is repeated. Accordingly, after each N clock pulse, one clock cycle is dropped from the stream of clock pulses on 125.

The aforedescribed cycle stealing relationship may be expressed by the following equation:

$FR = N/N+1$

F is clock frequency of clock 70, N is the number to which divider 100 is set, and FR is the % reduction.

In the examples shown in Table I, where N is an integer number between 25 and 499, the % reduction FR can be adjusted from 96.15% to 99.80% of the clock frequency in F approximately 0.2% increments by selecting the various values shown for N. By using 98% of the clock frequency F as nominal, the output frequency obtained can be considered adjustable +/−1.8%.

Using 98% of the clock frequency F as nominal for the polygon clock implies using a crystal whose actual frequency is 102% of the normal frequency. This is because, with clock frequency F at 102% and a cycle stealing circuit operating at an FR of 98%, the product is a polygon clock frequency at 100% of nominal. Where the clock frequency is 100% of nominal, it is understood that no change in image size takes place as shown in Table I for example at an FR of 98%. Similarly, since the pixel clock passes through two cycle stealing circuits, the nominal is 96%. Where a pixel clock frequency at 100% of nominal is desired, the frequency F of clock 70 must be 104% of normal. In that case, the polygon clock frequency will be at 102% of nominal.

Where both a polygon clock frequency and a pixel clock frequency at 100% of nominal are desired, appropriate selection of frequencies and circuitry are used to provide a crystal frequency which is 102% of the polygon speed and 104% of the pixel clock frequency when there are no cycle stealing circuits. Thus, with cycle stealing circuits, the nominal outputs will be normal.

TABLE

| N | % Reducton | Δ% 98% Base |
| --- | --- | --- |
| 25 | 96.15% | −1.85% |
| 27 | 96.43% | −1.57% |
| 28 | 96.55% | −1.45% |
| 30 | 96.77% | −1.23% |
| 32 | 96.97% | −1.03% |
| 35 | 97.22% | −.78% |
| 37 | 97.37% | −.63% |
| 41 | 97.62% | −.38% |
| 44 | 97.78% | −.22% |
| 49 | 98.00% | |
| 55 | 98.21% | +.21% |
| 62 | 98.41% | +.41% |
| 70 | 98.59% | +.59% |
| 82 | 98.80% | +.80% |
| 99 | 99.00% | +1.00% |
| 124 | 99.20% | +1.20% |
| 166 | 99.40% | +1.40% |
| 249 | 99.60% | +1.60% |
| 499 | 99.80% | +1.80% |

While the invention has been described with reference to the structure disclosed, it is not confined to the details set forth, but is intended to cover such modifications or changes as may come within the scope of the following claims.

I claim:

1. In a printer for printing images having a width and a length, a printer magnification control for selectively controlling the width, length, or both the width and length of the images printed by the printer, the printer having a laser beam for exposing a photoconductive member, a rotatable scanning element for scanning the beam across the photoconductive member, and control means for controlling beam intensity in accordance with image pixels, comprising:

(a) a source of master clock signals;

(b) a first means for adjusting the clock signals output by said master clock to provide pixel clock signals at a predetermined frequency for clocking the image pixels to said beam controller;

(c) a second means for adjusting the clock signals output by said master clock to provide control clock signals at a predetermined frequency for use in controlling the rotational speed of said scanning element;

(d) a first adjustable cycle stealing circuit interposed between said master clock and said first and second means for periodically dropping a selected one of the clock pulses in the clock signal output of said master clock to said first and second means whereby to proportionally change only the length of the images printed by said printer, and (e) a second adjustable cycle stealing circuit interposed between said first cycle stealing circuit and said second means for periodically dropping a selected one of the clock pulses in the clock signal output of said first cycle stealing circuit to said second means whereby to proportionally change only the width of the images produced by said printer.

2. The system according to claim 1 in which each of said first and second cycle stealing circuits includes:

a control gate through which clock signals input to said cycle stealing circuit are output;

a programmable divider responsive to a preselected count to interrupt the clock signals through said control gate, said divider being driven by said clock signal input; and a flip flop responsive to a succeeding one of said clock signals to reset said divider whereby to resume said clock signal output.

3. In a printer having a recording member, drive means for moving said recording member in a first direction, a beam of high intensity radiation, scanning means for repeatedly scanning the beam across the recording member in a second direction substantially at right angles to said first direction, a source of image signals, and control means for controlling said beam in accordance with said image signals to write images having a length and a width on said recording member, the combination of:

(a) a source of clock signals;

(b) means to provide from said clock signals output by said clock signal source discrete first clock signals for clocking said image signals from said image signal source to said control means and second clock signals for controlling the rate at which said scanning means scans said beam across said recording member;

(c) a first cycle stealing circuit for dropping a predetermined one of the clock signals from said clock signals output by said clock signal source whereby to adjust the clock rates of both said first clock signals and said second clock signals and the rate at which image signals are clocked to said control means and the rate at which said scanning means scans said beam across said recording member; and (d) a second cycle stealing circuit for dropping a predetermined one of said first clock signals only whereby to adjust said first clock signals and the rate at which image signals are clocked to said control means.

4. Means for independently adjusting the width and length of an image produced by a raster output scanner, said scanner having a high intensity beam of radiation, a movable recording member on which images are formed, a rotatable scanning element for scanning the beam across the recording member in a direction perpendicular to the direction of movement of said recording member, and modulating means to modulate the beam in accordance with an input of image pixels whereby to produce images on said recording member reflecting the image content of said image pixels, said means providing a desired image size in spite of changes in the velocity of said recording member and/or said scanning member, and/or changes in the clock rate at which image pixels are clocked to said modulating means, the combination of:

(a) a source clock providing clock signals at a predetermined frequency;
(b) a pixel clock having said clock signals from said source clock input thereto, said pixel clock outputting pixel clock signals at a predetermined frequency for clocking said image pixels to said modulating means;
(c) a scanning element clock having said clock signals from said source clock input thereto, said scanning element clock outputting scanning clock signals at a predetermined frequency for controlling the rotational speed of said scanning element;
(d) a first cycle stealing circuit for adjusting the clock signals from said source clock to both said pixel clock and to said scanning element to adjust the length of the image, adjusting the clock signals from said source clock to both said pixel clock and to said scanning element clock maintaining the frequency relation between the pixel clock signals output by said pixel clock and the scanning clock signals output by said scanning element clock; and
(e) a second cycle stealing circuit for adjusting the clock signals from said source clock to said pixel clock to alter the frequency of the pixel clock signals output by said pixel clock to adjust the width of the image, adjusting the clock signals from said source clock to said pixel clock changing the frequency relation between the pixel clock signals output by said pixel clock and the scanning clock signals output by said scanning element clock.

* * * * *